United States Patent
Breitbach et al.

[15] 3,661,507
[45] May 9, 1972

[54] PROCESS FOR DECOMPOSING AMMONIA

[72] Inventors: Fritz Breitbach; Gustav Choulat, both of Recklinghausen, Germany

[73] Assignee: Firma Carl Still, Recklinghausen, Germany

[22] Filed: Apr. 10, 1969

[21] Appl. No.: 824,340

Related U.S. Application Data

[63] Continuation-in-part of Ser. No. 369,187, May 21, 1964, abandoned.

[52] U.S. Cl. .....................................23/2 R, 23/2 S, 23/2 C, 23/3, 23/193, 23/212, 23/220
[51] Int. Cl. ......................................B01d 53/34, C01b 2/04
[58] Field of Search ......................23/2, 3, 2 C, 42, 193, 220

[56] References Cited

UNITED STATES PATENTS

| | | | |
|---|---|---|---|
| 2,013,809 | 10/1935 | Salisbury | 23/220 X |
| 3,000,693 | 9/1961 | Schulte | 23/2 |
| 3,020,138 | 2/1962 | Wethly | 23/3 |

FOREIGN PATENTS OR APPLICATIONS

| | | | |
|---|---|---|---|
| 167,182 | 3/1956 | Australia | 23/220 |

Primary Examiner—Earl C. Thomas
Attorney—McGlew and Toren

[57] ABSTRACT

Process of decomposing the ammonia of impure ammonia-containing vapor clouds, particularly ammonia-containing vapor clouds emanating from coke oven plants and gas works and contaminated by hydrogen sulfide, cyano compounds like HCN, benzene naphthaline and the like. The vapor clouds are first heated to the decomposition temperature of the ammonia, whereafter the hot clouds are passed at this temperature through a decomposition zone to cause decomposition of the ammonia into hydrogen and nitrogen. The combustible matter in the decomposed gases is then burned in an intermediately installed combustion zone by supplying combustion air. The combustible matter including the hydrogen may be burned at a place remote from the decomposition plant or may be added to other gases.

10 Claims, 3 Drawing Figures

3,661,507

PROCESS FOR DECOMPOSING AMMONIA

TO PRIOR APPLICATION

This is a continuation-in-part of application Ser. No. 369,187 filed May 21, 1964 and now abandoned.

SUMMARY OF INVENTION

This invention generally relates to the processing of ammonia-containing fluids and is particularly directed to a process suitable for the destruction or decomposition of ammonia obtained in the processing of coke oven plants or gas works.

As in generally known in the art, relatively large amounts of ammonia are developed in the operation of coke oven plants and gas works. This ammonia is usually separated from the other products by washing with water. In this case the ammonia is separated from the wash liquor in an ammonia still by admixing pure vapor into the still.

The ammonia-containing vapor clouds obtained from such sources are as a rule contaminated by hydrogen sulfide, carbon dioxide, benzene, benzene homologues and derivatives, naphthaline, cyano compounds and tar; and it is well know to supply such vapor clouds to the poor gas generators, which produce the heating gas for the coke oven plant. In the lean gas generators the ammonia content of the vapor clouds is decomposed to nitrogen and hydrogen.

This prior art procedure, however, has a serious drawback because the decomposition of the ammonia also results in the formation of significant amounts of nitrogen oxides. In the production of town gas or long distance supplied gas, the lean gas is oftentimes added to the gas emanating from the coke oven plant. Due to the presence of the nitrogen oxides in the lean gas as referred to, the resulting town or long distance gas thus contains relatively high amounts of nitrogen oxides. This, of course, is highly undesired. Moreover, for this process lean gas generators are necessary.

Accordingly, it is a primary object of this invention to provide for a process by means of which the ammonia originally emanating from coke oven plants or gas works is decomposed or destroyed without the formation of nitrogen oxides.

According to another object of the invention, the inventive process renders it possible to decompose the ammonia without lean gas generators of the prior art and in such a manner that the combustion heat resulting from the gases obtained by the decomposition can be fully utilized for gainful purposes and without formation of nitrogen oxides.

Generally it is an object of this invention to improve on the art of processing ammonia-containing fluids for the purpose of decomposing the ammonia contained therein.

Briefly and in accordance with this invention, contaminated ammonia clouds, originally obtained in the processing of condensates and wash liquors from coke oven plants and gas works, are decomposed into nitrogen and hydrogen without the formation of nitrogen oxides, by first heating the ammonia-containing vapor clouds to the decomposition temperature of the ammonia in a heating zone, and then,, passing the vapor clouds with the ammonia at such temperature through a decomposition zone. The combustible gases obtained in the decomposition zone are then burned in a combustion zone which is adjacent to or remote from the decomposition zone.

The heating of the ammonia clouds to the decomposition temperature in the heating zone is accomplished by the combustion of a heating medium, for example, a gaseous or liquid fuel in the presence of an amount of combustion air for the heating medium only.

The decomposition zone may comprise a chamber which is filled with temperature resistant filling bodies. Further, the decomposition zone may contain a nickel catalyst of a suitable nature.

The hydrogen which is formed as a result of the decomposition of the ammonia and the carbon monoxide which is formed as a result of the decomposition of the benzole, napthaline and tar content of the vapor clouds and by combustion of the heating medium under air deficiency may be completely burned either alone or in mixture with other burnable gases behind the decomposition zone by supplying a secondary air stream. The hot gases or off-gases formed in the process after passing the reactor are then conducted into a waste heat boiler for the purpose of utilizing the heat thereof, or these gases may be utilized in any other suitable manner. It is also within the scope of this invention simply to cool the gases in any desired manner in the event that the utilization of the waste heat is of no importance.

According to the invention, the ammonia-containing vapor clouds to be decomposed may be mixed with the heating medium, e.g., the fuel and/or the combustion air, prior to the combustion of the fuel in the heating zone. In order to maintain a reducing atmosphere, the amount of combustion air supplied to the mixture should be smaller than the quantity which is necessary to effect a complete combustion of the fuel.

The heating zone is advantageously the working space of a reactor or combustion chamber with a burner arranged at the inlet side of the reactor. The entire amount of the vapor clouds or a portion thereof may then be mixed with the heating medium or the combustion air before the heating medium reaches the burner. However, it is feasible to supply the vapor clouds, the heating medium and the combustion air as separate flows to the heating zone in the reactor.

While it is possible to perform the heating and combustion of the ammonia vapor clouds with an excess of combustion air in a single step and without decomposition in a reducing atmosphere, experience has shown that such procedure results in the formation of combustion gases which contain significant amounts of undesired nitrogen oxides. For this purpose, the process according to this invention is performed in reducing atmosphere.

The inventive procedure may be facilitated by a number of secondary features. Thus, for example, in some instances it may be desired to supply the ammonia clouds to the reactor with as low a content of water (steam) as possible. For this purpose, the vapor clouds, prior to being supplied to the reactor, may be concentrated by multi-stage distillation. In this manner the ammonia content in the clouds will be significantly increased.

For several purposes it is desirable that the off-gases from the reactor contain but very small amounts of hydrogen sulfide. To this end, the ammonia-containing wash liquor, prior to expelling the ammonia, may be passed in known manner through a deacidifier for instance in a wet desulphurization plant. The hydrogen sulfide vapor clouds formed in this manner and containing small amounts of ammonia may be at a suitable point again combined with the crude gas, from which the hydrogen sulfide may be removed in known manner, for example, by dry purification. It is also possible to process the hydrogen sulfide clouds in known manner to form sulfur or sulfuric acid.

According to a further modification of the invention, ammonia-containing liquids emanating from different plants or process stations may be combined and collected and the ammonia may be decomposed in a central plant or decomposition station.

These gases from the decomposition plant are poor in calorific value and may then be admixed with the crude gases of the gas producing plant which are high in calorific value. In this manner, the calorific value of the coke oven plant or gas works gas is considerably reduced to the desired low value of town gas.

However, according to a different embodiment of the inventive process, it is possible to admix the hydrogen sulfide-containing gases with hydrogen sulfide-containing vapor clouds emanating from a wet desulphurization plant and to burn this mixture in the furnace of a sulfur or sulfuric acid plant.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there are illustrated and described preferred embodiments of the invention.

DESCRIPTION OF THE DRAWING

The single FIGURE of the drawing is a diagrammatic representation of one embodiment of a plant for carrying out the inventive procedure.

Referring now to the diagrammatic representation of the figure, reference numeral 1 indicates schematically a reactor to be heated to the required decomposition temperature. For this purpose the reactor 1 is heated by the combustion of a gaseous or liquid fuel which is supplied to a burner 3 through line 2. The combustion air necessary to accomplish combustion of the fuel flowing through line 2 is supplied to the burner 3 through line 4. The amount of combustion air is adjusted so that a reducing atmosphere is produced in the reactor. The ammonia vapor clouds to be decomposed can be supplied to the reactor in different ways. According to one embodiment, these ammonia clouds may be supplied through the line 5 so that they will directly enter the combustion chamber 8 of the reactor 1. According to a second possibility, the ammonia clouds may be supplied jointly with the combustion air through the lines 5, 6 and 4. Further, it is also possible to supply the ammonia clouds jointly with the fuel through the lines 5, 7 and 2. In all these instances, the ammonia clouds are introduced into the chamber 8 of the reactor 1, which constitutes the heating zone, and are heated to the reaction or decomposition temperature. In the embodiment shown in the figure, there thus occurs actual mixing of the heating medium and the ammonia clouds.

Figure 1:
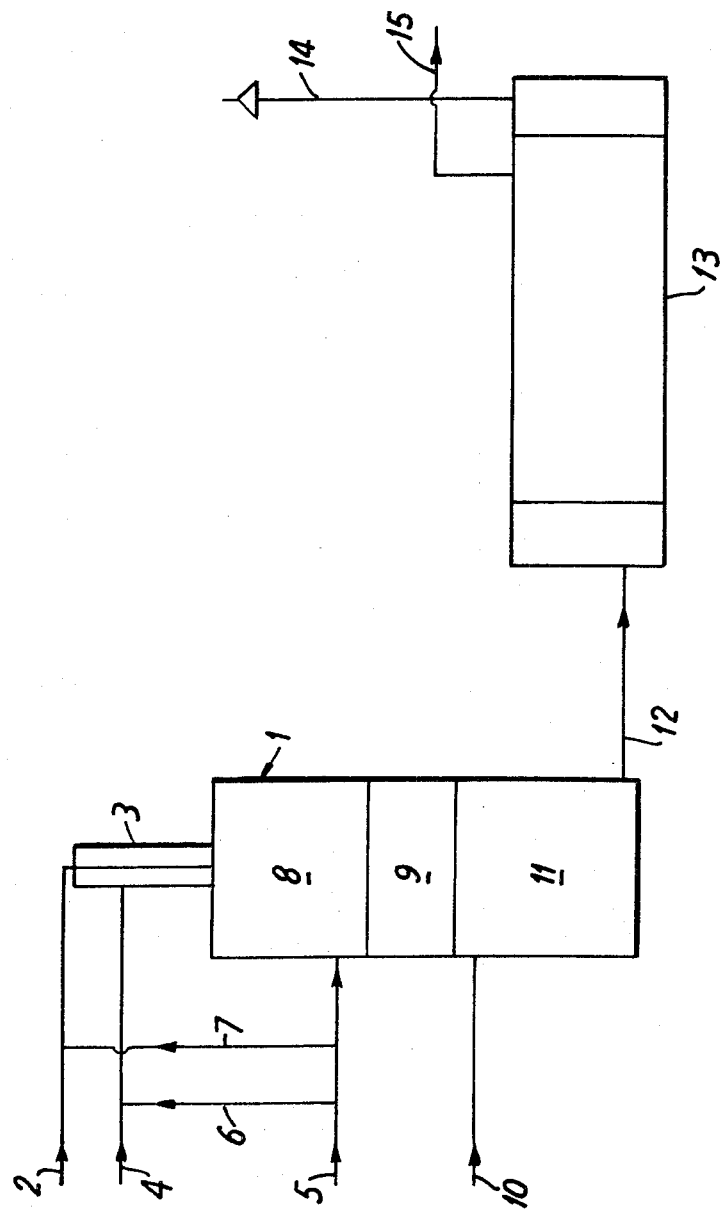
Figure 2:
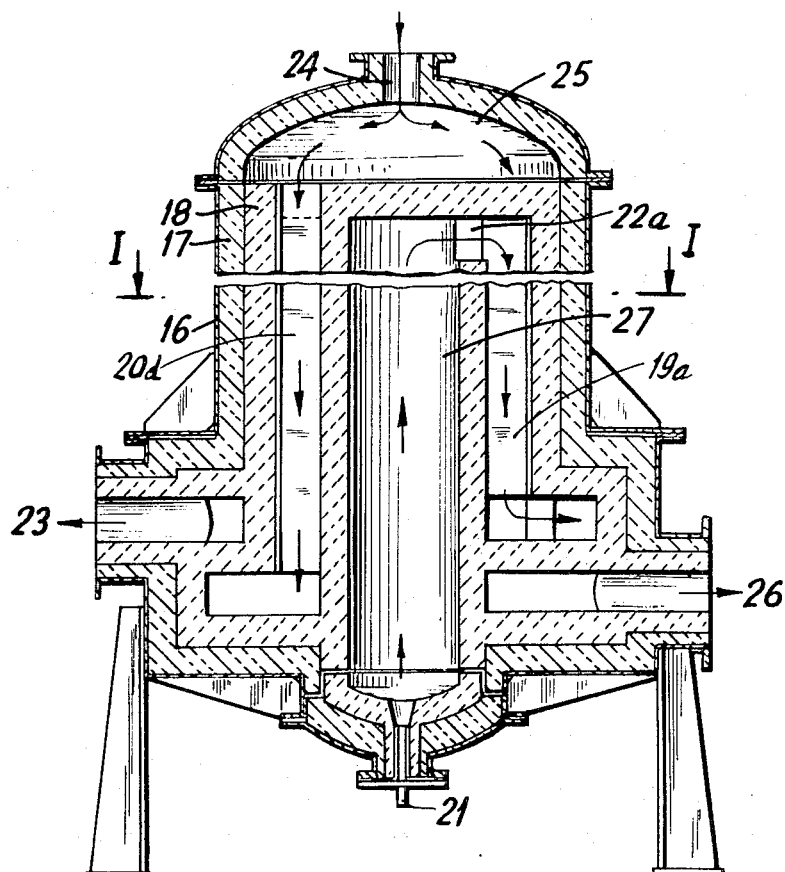
Figure 3:
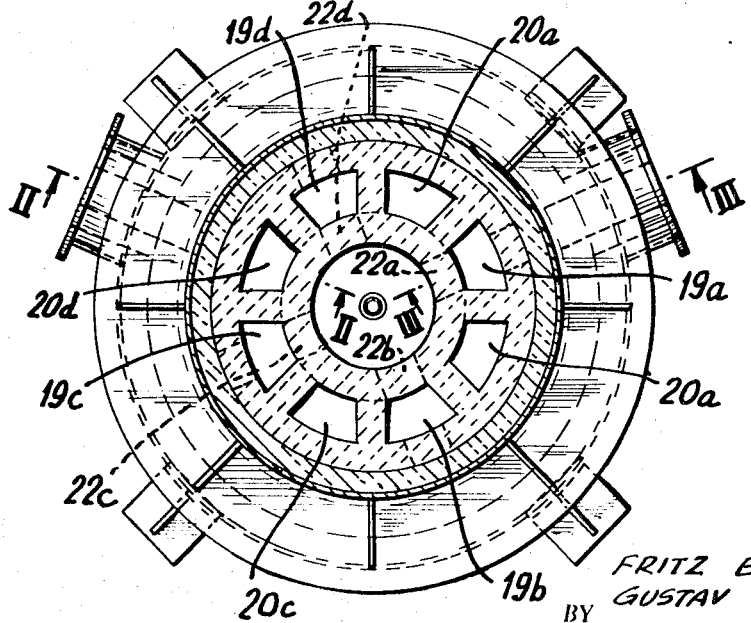

After the ammonia clouds have been heated to the necessary decomposition temperature, they are then, jointly with the off-gases from the combusted heating gases, passed through the decomposition zone 9 for complete decomposition of the ammonia. The zone 9 may be filled with filling bodies or with a suitable nickel catalyst.

The admixing of a part or the whole of the vapor clouds to the heating gas or to the combustion air before the burner makes it possible that during the combustion with a deficiency of air no carbon black is formed.

By supplying secondary air which, through line 10, enters a combustion zone, combustion of the combustible matter formed in the decomposition zone may be effected close to the decomposition zone. This means that any combustible matter which is formed in the decomposition of the ammonia is completely burned up in the combustion zone 11 due to the introduction of the secondary air through line 10.

The hot off-gases flow subsequently through line 12 to reach the waste heat boiler 13. The off-gases are discharged to the atmosphere through the chimney 14. The steam which is produced in the waste heat boiler flows through line 15 to any suitable point of utilization, i.e., it may be supplied to the steam network of the plant. The hot off-gases of the after-combustion zone may, of course, also be utilized or cooled in any other suitable manner.

The burnable hydrogen-containing gas may, however, be burned at a place remote from the plant. In other words, the burning may be delayed until the gas has been conveyed to a suitable place of utilization where the gases are burned in situ, if desired, after admixture with other gases. In this case the gas, which leaves the reactor with about 1,000° C, is also conducted into a waste heat vessel for using its content as waste heat.

In this specification, the terms kg/d and m³/d signify kilograms per day, and square meters per day, respectively.

COMPARISON EXAMPLE

The coking of 1,000 tons of dry coal results in the formation of 2,600 kg/d of ammonia. This ammonia may, for example, be contained in 220 m³/d of wash water and condensate. The ammonia is expelled from this liquor in known manner so that the ammonia clouds formed contain about 250 kg of ammonia per long ton and in addition to the other customarily accompanying substances 750 kg of steam per ton. These ammonia clouds are supplied to the reactor 1 through line 5, as shown in the Figure. 260 Nm³/h (atmospheric pressure) of coke oven gas are supplied through line 2 while 1,100 Nm³/h of air are introduced through line 4. The coke gas amount is adjusted in such a manner that the heat resulting from its combustion is utilized for the decomposition of the ammonia into nitrogen and hydrogen and that the gas mixture which exits from the decomposition zone 9 has a temperature of about 1,000° C. This hot mixture enters into the combustion zone 11 into which are supplied about 750 Nm³/h air through line 10.

After the combustion of the combustible gases which have been formed, the combustion gases leave the after-combustion zone 11 through line 12 and enter the waste heat boiler 13. 40,000 kg/d of steam (40 atms) are obtained which are discharged from the waste heat boiler through line 15.

The off-gases which leave through the chimney 14 do not contain any significant amount of nitrogen oxides.

If, by contrast, ammonia clouds are supplied to an ordinary prior art combustion furnace, where the clouds are burned up in a single stage with the same coking gas amount and in the presence of 1,850 Nm³/h of air, so that nitrogen and water are formed from the ammonia, an off-gas leaves the chimney which contains up to 4.8 grams of nitrogen oxides per Nm³. By contrast, according to the present invention, as previously stated, only the fuel is burned at the beginning in the heating zone, and the hot mixture to be decomposed is conveyed first to a decomposition zone and subsequently and under admixture of additional combustion air to a combustion chamber where the hydrogen is completely burned up so that an off-gas is obtained which does not contain any nitrogen oxides.

The inventive process has a number of advantages in addition to avoiding the formation of nitrogen oxides. These advantages may be summarized as follows:

1. By admixing of a part of the vapor clouds with the heating gas or the combustion air before the burner the formation of carbon black is avoided.

2. The formed in the decomposition may be burned at a place remote from the decomposition plant, to wit, at the place of use of the decomposed gas.

3. The gas from the decomposition zone may be admixed with other burnable gases before combustion. It can also may thus be admixed with crude gas which latter, after purification, is conveyed through long distance lines for consumer use.

4. However, the hydrogen-containing decomposition gas may be burned directly behind the decomposition zone by adding combustion air. In the latter case, the combustion heat may be effectively utilized for steam generation.

5. In prior art procedures, the catalyst is inactivated by carbon which is customarily formed in one-step decomposition procedures. By contrast, in the present plural-step process, no inactivation of the nickel catalyst by carbon takes place in the decomposition zone and the ammonia is quantitatively decomposed.

6. Since the decomposition takes place in a reducing atmosphere, no nitrogen oxides are formed. The organic contaminants contained in the vapor clouds, such as naphthaline, benzene and its homologues are decomposed to $CO_2$, $CO$ and $H_2$, while the cyano contaminants form $CO$, $N_2$ and $H_2$. By contrast, the hydrogen sulfide is not affected by the process and is not decomposed.

It is a novel and beneficial realization that the ammonia of ammoniacontaining vapor clouds of the kind with which the invention is concerned, can be successfully decomposed without decomposing or affecting the hydrogen sulfide contained in the clouds. The unaltered hydrogen sulfide may thus be subsequently processed into sulfur and/or sulfuric acid. Further, the nickel catalyst is not affected by the hydrogen sulfide but retains its activity throughout.

What is claimed is:

1. Process of treating ammonia containing gases which originally are obtained from coke oven plants and gas works as contaminated steam vapor clouds in the processing of condensates and wash liquors, said vapor clouds also containing water, hydrogen sulfide, carbon dioxide, benzene derivatives, naphthaline and cyano compounds, which process comprises:
   a. mixing said vapor clouds with a combustible heating medium or combustion air and burning the heating medium in the presence of an insufficient amount of air in a heating zone, thereby to heat the vapor clouds in a reducing atmosphere to the decomposition temperature of the ammonia;
   b. thereafter passing the hot gas mixture at the decomposition temperature to an ammonia decomposition zone to decompose said ammonia, benzene derivatives, naphthaline and cyano compounds into nitrogen and hydrogen containing gases without decomposing said hydrogen sulfide; and
   c. then burning the combustible matter formed at a place remote from said decomposition zone.

2. Process as claimed in claim 1, wherein said vapor clouds are at least partially mixed with said combustible heating medium and/or said air outside said heating zone and before said heating medium is burned in said heating zone.

3. Process as claimed in claim 1, wherein said decomposition zone contains filling bodies.

4. Process as claimed in claim 1, wherein said decomposition zone contains a nickel catalyst.

5. Process as claimed in claim 2, wherein the gases formed in step (b) are conveyed from the decomposition zone to a place of use where the hydrogen and nitrogen containing gases are burned in situ.

6. Process as claimed in claim 5, wherein the combustible gases, prior to being burned, are admixed with other combustible gases.

7. Process as claimed in claim 1, wherein the combustible matter formed in step (b) is burned in a separate combustion zones to which the combustible matter is conveyed from the decomposition zone.

8. Process as claimed in claim 1, wherein the water content of said vapor clouds is extensively removed prior to said heating to the decomposition temperature.

9. Process as claimed in claim 1, wherein said hydrogen sulfide is partially removed by deacidification prior to admixing the vapor clouds with said heating medium.

10. Process as claimed in claim 1, wherein the steam vapor clouds are derived from combined ammonia waters emanating from different sources.

* * * * *